US007065051B2

(12) United States Patent
Airy et al.

(10) Patent No.: US 7,065,051 B2
(45) Date of Patent: Jun. 20, 2006

(54) MANAGEMENT AND SCHEDULING OF DATA THAT IS WIRELESSLY TRANSMITTED BETWEEN A BASE TRANSCEIVER STATION AND SUBSCRIBER UNITS

(75) Inventors: Manish Airy, San Jose, CA (US);
Partho Mishra, Cupertino, CA (US);
Huzur Saran, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 09/819,947

(22) Filed: Mar. 27, 2001

(65) Prior Publication Data
US 2002/0142780 A1 Oct. 3, 2002

(51) Int. Cl.
*G01R 31/08* (2006.01)
(52) U.S. Cl. ...................... 370/236; 370/412; 370/428; 370/343
(58) Field of Classification Search ................. 370/229, 370/230, 235, 236, 328, 329, 341, 343, 428, 370/429, 412
See application file for complete search history.

(56) References Cited

U.S. PATENT DOCUMENTS 6,577,613 B1 * 6/2003 Ramanathan ............... 370/337
6,587,444 B1 * 7/2003 Lenzo et al. ................ 370/330
6,594,238 B1 * 7/2003 Wallentin et al. ........... 370/252
6,608,816 B1 * 8/2003 Nichols ...................... 370/235
2002/0093928 A1 * 7/2002 LoGalbo et al. ............ 370/336

* cited by examiner

*Primary Examiner*—Ajit Patel
(74) *Attorney, Agent, or Firm*—Michael A. Proksch

(57) ABSTRACT

The invention includes an apparatus and method for wirelessly transmitting data between a plurality of subscriber units and a base transceiver station. The method includes at least one subscriber unit transmitting a request to send data blocks to the base transceiver station. The request includes a data transmission queue size value. A base user queue size estimate is updated at the base transceiver station. The base user queue size estimate corresponds to the one subscriber unit that transmitted the request to send data. The base user queue size estimate is based upon the data transmission queue size value. The base transceiver station generates a schedule that includes time slots and frequency blocks in which the requested data blocks are to be transmitted from the one subscriber unit to the base transceiver station. The subscriber unit transmits the data blocks the subscriber requested to be sent, according to the schedule. Each transmitted data block includes encoded information representing a current data transmission queue size value. The base user queue size estimate is updated based upon the encoded information. The base user queue size estimate influences future schedules generated by the base transceiver station.

40 Claims, 12 Drawing Sheets

| NUMBER OF DATA BLOCKS TO BE TRANSMITTED | CORRESPONDING RANGE OF VALUES ENCODED IN THE HEADER OF A TRANSMITTED SUB-PROTOCOL DATA UNIT | ENCODED DATA BITS |
|---|---|---|
| 0 | 0 | 000 |
| 1 | 1 | 001 |
| 2 | 2-3 | 010 |
| 3 | 2-3 | 010 |
| 4 | 4-6 | 011 |
| 5 | 4-6 | 011 |
| 6 | 4-6 | 011 |
| 7 | 7-10 | 100 |
| 8 | 7-10 | 100 |
| 9 | 7-10 | 100 |
| 10 | 7-10 | 100 |
| ... | .... | |

FIGURE 7

MANAGEMENT AND SCHEDULING OF DATA THAT IS WIRELESSLY TRANSMITTED BETWEEN A BASE TRANSCEIVER STATION AND SUBSCRIBER UNITS

FIELD OF THE INVENTION

The invention relates generally to wireless communications. More particularly, the invention relates to management and scheduling of data that is wireless transmitted between a base transceiver station, and multiple subscriber units.

BACKGROUND OF THE INVENTION

Wireless communication systems commonly include information carrying modulated carrier signals that are wirelessly transmitted from a transmission source (for example, a base transceiver station) to one or more subscribers (for example, subscriber units) within an area or region.

FIG. 1 shows a portion of a single cell of a cellular wireless network system. A base transceiver station 110 provides a wireless connection to a plurality of subscriber units 120, 130, 140. The base transceiver station is generally connected to a network that provides access to the Internet. The cell of FIG. 1 is generally repeated forming a cellular network. The base transceiver station 1 10 and the subscriber units 120, 130, 140 include one or more antennas allowing two-way communication between the base transceiver station 110 and the subscriber units 120, 130, 140.

Generally, information is transmitted between the base transceiver station 110 and the subscriber units 120, 130, 140 in packets or units of data. Typically, a schedule or map must be generated that determines when the units of data are transmitted between base transceiver station 110 and subscriber units 120, 130, 140. The bandwidth of the available transmission frequencies is limited. Therefore, the transmission between multiple transceiver stations and subscriber units generally requires time, frequency, or some other type of multiplexing. The larger the number of base station transceivers and subscriber units, the more complex the scheduling or mapping.

The transmission can be time division duplex (TDD). That is, the down link transmission (transmission from the base transceiver station to a subscriber unit) can occupy the same channel (same transmission frequency) as the up link transmission (transmission from a subscriber unit to the base transceiver station), but occur at different times. Alternatively, the transmission can be frequency division duplex (FDD). That is, the down link transmission can be at a different frequency than the up link transmission. FDD allows down link transmission and up link transmission to occur simultaneously.

Generally, wireless systems are not as reliable as wired system. As a result, data being transferred between a base transceiver station and a subscriber can be miscommunicated or lost. This condition makes the scheduling difficult, because of difficulties in determining whether data must be rescheduled and retransmitted due to being lost. Tracking the amount of data to be transferred at both the base transceiver station and at the subscriber unit aids in the management of the wireless transmission of data between the base transceiver station and the subscriber unit.

Generally, a subscriber unit must indicate to the base transceiver station that the subscriber unit has data to be transmitted to the base transceiver station. This can be accomplished by the subscriber unit transmitting a Request to Send (RTS) signal to the base transceiver station when the subscriber unit has data to transmit to the base transceiver station. It is possible for more than one subscriber unit to transmit an RTS signal at the same time, causing RTS signals to never be received by the base transceiver station. Therefore, most wireless systems include contention management to account for simultaneous RTS transmissions. Contention management can include re-sending RTS signal according to some predetermined pattern. The fact that RTS signals typically have to be transmitted multiple time in order to be successfully received, reduces the efficiency of a wireless system.

It is desirable to have an apparatus and method that provides scheduling and management of the transmission of data blocks between a base station transceiver and at least one subscribers unit. It is desirable that the scheduling be able to successfully manage data blocks that are lost while in transmission, minimize the number of RTS signals transmitted, and minimize the management of the transmission scheduling. Additionally, it is desirable that the data block transmission be adaptive to the quality of transmission links between the base station transceiver antennas and each of the subscribers (subscriber) units.

SUMMARY OF THE INVENTION

The invention includes a method and apparatus that efficiently manages scheduling of the transmission of data between a base transceiver station and a plurality of subscriber units. The invention minimizes the number of RTS signals required, and accounts for data that is lost during transmission between the base transceiver station and the subscriber units. Additionally, the scheduling is adaptive to the quality of a transmission link between the base transceiver station and the subscriber units.

A first embodiment of the invention includes a method for wirelessly transmitting data between a plurality of subscriber units and a base transceiver station. The method includes at least one subscriber unit transmitting a request to send data blocks to the base transceiver station. The request includes a data transmission queue size value. A base user queue size estimate is updated at the base transceiver station. The base user queue size estimate corresponds to the one subscriber unit that transmitted the request to send data, the base user queue size estimate is based upon the data transmission queue size value. The base transceiver station generates a schedule that includes time slots and frequency blocks in which the requested data blocks are to be transmitted from the one subscriber unit to the base transceiver station. The subscriber unit transmits the data blocks the subscriber earlier requested to sent, according to the schedule. Each transmitted data block includes encoded information representing a current data transmission queue size value. The base user queue size estimate is updated based upon the encoded information. The base user queue size estimate influences future schedules generated by the base transceiver station.

A second embodiment of the invention is similar to the first embodiment. For the second embodiment, the data blocks include at least portion of a data unit. Each data unit includes encoded information representing the current data transmission queue size value. The number of data units within each data block can be dependent on a transmission mode.

A third embodiment of the invention is similar to the second embodiment. The third embodiment includes encoding the current data transmission queue size value within a plurality of bits within headers of the data units. The encoding can include encoding a range of data blocks within the plurality of bits within headers of the data units.

A fourth embodiment of the invention is similar to the first embodiment. The fourth embodiment includes receiving and decoding a number that represents a number of data blocks to be transferred. This can include receiving a range of data blocks, and determining the current data transmission queue depending upon the received range and an up-link transmission mode.

A fifth embodiment includes a method for wirelessly transmitting data between a transmitter and a receiver. The method includes updating at the receiver, a receiver user queue size estimate that corresponds to the transmitter that transmitted a request to send data blocks, the receiver user queue size estimate being based upon a data transmission queue size value of the transmitter. The transmitter generates a schedule that includes time slots and frequency blocks in which the requested data blocks are to be transmitted from the transmitter to the receiver. The transmitter transmits the data blocks the transmitter requested to send according to the schedule. Each transmitted data block includes encoded information representing a current data transmission queue size value. The receiver user queue size estimate is updated based upon the encoded information. The receiver user queue size estimate influences future schedules generated by the transmitter.

A sixth embodiment includes a method for wirelessly receiving information from a transmit unit. The method includes receiving a request to send data blocks from the transmit unit, the request including a data transmission queue size. A user queue size is updated based upon the data transmission queue size. A schedule is generated that includes time slots and frequency blocks in which the requested data blocks are to be transmitted. The requested data blocks are received according to the schedule. Each transmitted data block includes encoded information representing a current data transmission queue value. The user queue size estimate is updated based upon the encoded information. The user queue size estimate influences the generation of the next schedule.

A seventh embodiment includes a method for wirelessly transmitting information from a transmit unit. The method includes the transmit unit transmitting a request to send data blocks to a receiver unit, the request including a data transmission queue size value. A schedule is received in which the data blocks are to be transmitted. The transmit unit transmits the requested data blocks according to the schedule. Each transmitted data block includes encoded information representing a current data transmission queue value. The current data transmission queue value influences the next schedule generated by the base transceiver station.

An eighth embodiment includes a system for wirelessly transmitting data between a plurality of subscriber units and a base transceiver station. The system includes at least one subscriber unit transmitting a request to send data blocks to the base transceiver station. The request includes a data transmission queue size value. At the base transceiver station, a base user queue size estimate that corresponds to the one subscriber unit that transmitted the request to send data, is updated. The base user queue size estimate is based upon the data transmission queue size value. A scheduler generates a schedule that includes time slots and frequency blocks in which the requested data blocks are to be transmitted from the one subscriber unit to the base transceiver station. The subscriber unit transmits the data blocks the subscriber requested to send according to the schedule. Each transmitted data block includes encoded information representing a current data transmission queue size value. The base user queue size estimate is updated based upon the encoded information. The base user queue size estimate influences future schedules generated by the base transceiver station.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7 is a table that shows an example of how ranges of values of the number of data blocks to be transmitted can be determined from the data transmission queue size.

DETAILED DESCRIPTION

Figure 1:
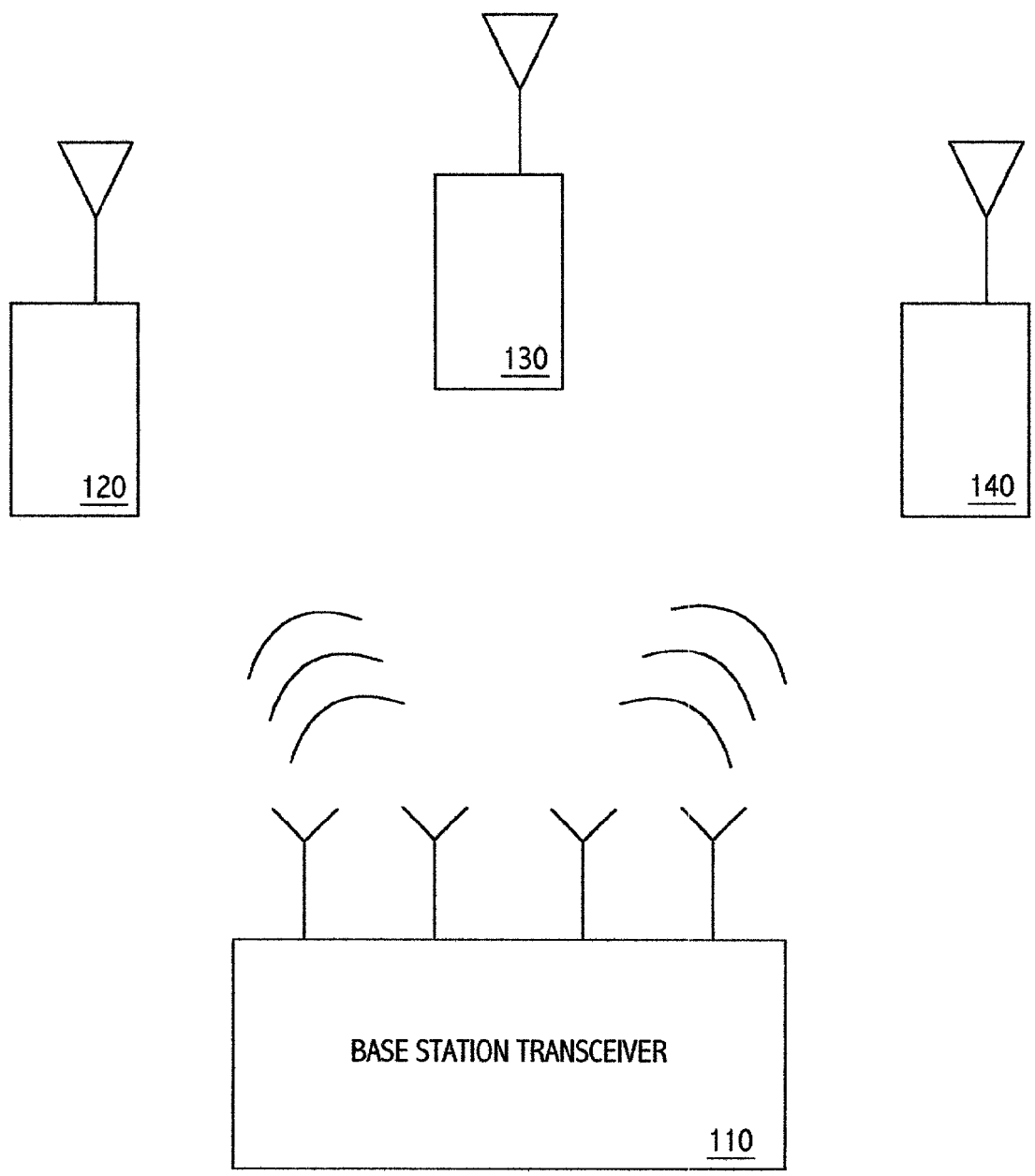
FIG. 1 shows a wireless system that includes a base station and multiple subscriber units.

As shown in the drawings for purposes of illustration, the invention is embodied in an apparatus and a method for managing and scheduling wireless transmission of data blocks between at least one antenna of a base transceiver station and multiple subscriber units. The scheduling generally includes maintaining data queues of the data blocks, and assigning frequency blocks and time slots to each of the subscriber units for receiving or transmitting data blocks.

As previously described, an embodiment of the invention includes wireless communication between at least one base transceiver station and subscriber units. The description of the invention will include two-way communication. That is, information is transmitted from the base transceiver station to the subscriber units (down link transmission), and information is transmitted from the subscriber units to the base transceiver station (up link transmission).

The description of the invention includes base transceiver stations and subscriber units. However, the invention can be extended to cover the transmission of data between any type of transmitter and receiver.

The transmission can be time division duplex (TDD). That is, the down link transmission can occupy the same channel (same transmission frequency) as the up link transmission, but occur at different times. Alternatively, the transmission can be frequency division duplex (FDD). That is, the down link transmission can be at a different frequency than the up link transmission. FDD allows down link transmission and up link transmission to occur simultaneously. The following discussion of the invention generally includes FDD. However, it should be understood that a TDD implementation is feasible.

As previously discussed, multiple subscriber units are in communication with at least once base transceiver station antenna. Multi-point wireless communication systems like this, can include time division multiplexing (TDM), frequency division multiplexing (FDM), code division multiplexing (CDM), spatial division multiplexing (SDM), or any combination thereof, for communicating with multiple units. The following discussion of the invention includes a TDM-FDM combination. However, it is to be understood that other combinations of the above described multiplexing schemes can be implemented.

Sub-protocol Data Units

Generally, a base transceiver station is connected to a network that supports standard protocol data units. The protocol data units can be Ethernet or ATM frames, or Internet protocol (IP) or frame relay packets. Before transmission, the protocol data units are divided into smaller sub-protocol data units that are more adaptable for transmission within wireless communication systems. The smaller sub-protocol data units facilitate more efficient error recovery through retransmission. Wireless channels tend to vary often. The smaller size of the sub-protocol data units makes it more likely that each data unit will experience a steady channel during transmission.

Scheduling of Data Transmission

The base transceiver station generally includes a scheduler that generates a map or schedule of when the sub-protocol data units are to be transmitted, which sub-protocol data units are to be received by which subscriber unit, and when and at what frequency band the subscriber units can transmit sub-protocol data units back to the base station transceiver. The map is transmitted to the subscriber units so that each subscriber units knows when to receive and transmit sub-protocol units. A map is transmitted once per unit of time. The unit of time is generally referred to as a frame. The time duration of a frame is variable. It is to be understood that the scheduler could also be located in a separately located base transceiver station, a base controller unit, or within a subscriber unit.

The scheduler can support the processing required for spatial multiplexing. That is, the scheduler can direct sub-protocol data units to be transmitted from multiple base transceiver antennae (single base or multiple bases) so that transmission to a particular subscriber unit includes spatial multiplexing. For spatial multiplexing, more sub-protocol data units are scheduled for transmission. The number of sub-protocol data units scheduled for transmission is dependent upon the spatial multiplexing order.

Frame Structures

Figure 2:
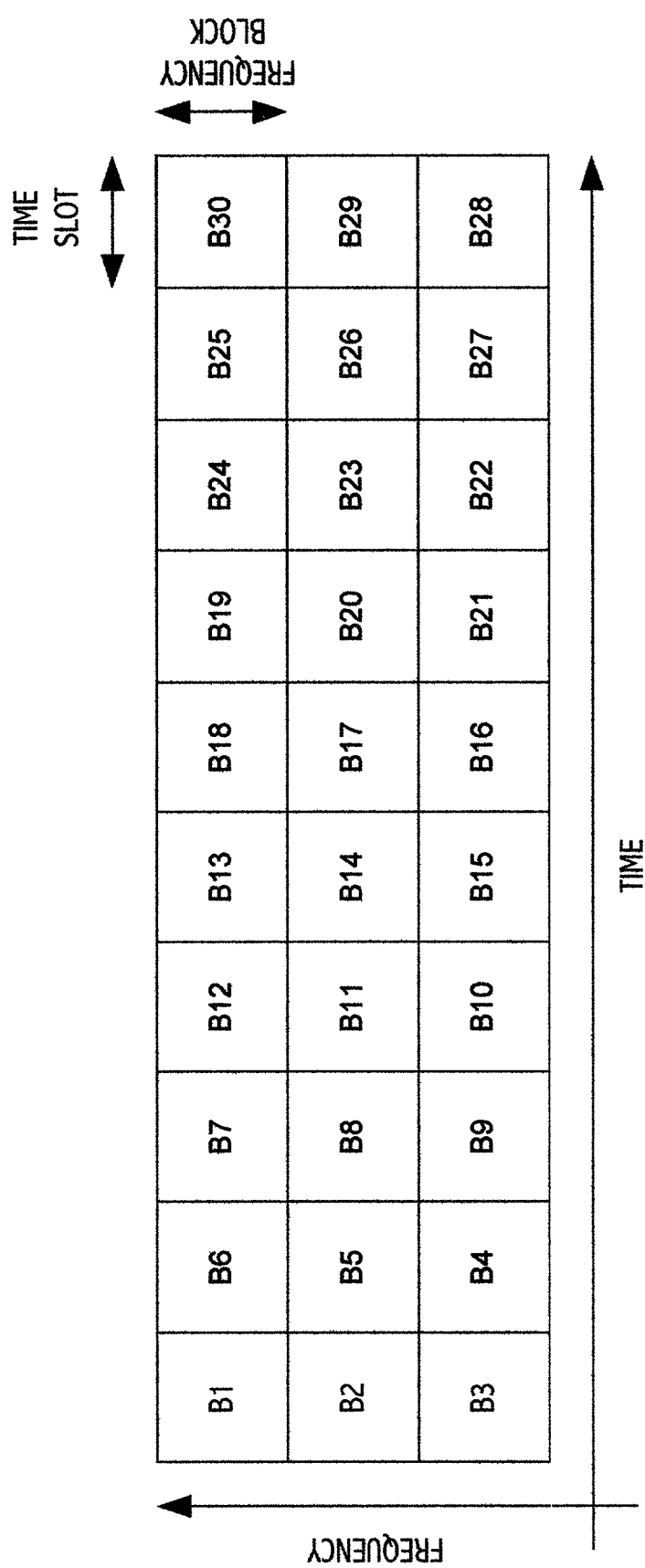
FIG. 2 shows a frame structure or map, that depicts blocks of transmission data defined by transmission time slots and transmission frequency blocks.

FIG. 2 shows a frame structure depicting blocks of transmission data defined by transmission time slots and transmission frequency blocks. The scheduler maps requests to transmit or receive data into such a frame structure. For example, data blocks B1, B2 and B3 can be transmitted during a first time slot, but over different frequency ranges or blocks. Data blocks B4, B5 and B6 are transmitted during a second time slot, but over different frequency ranges or blocks than each other. As depicted in FIG. 2, the entire transmission frequency range includes three frequency blocks within a frame. The numbering of the data blocks is depicted in the order chosen because of ease of implementation. The number of frequency blocks of the frame structure is optional.

Sub-protocol Data Unit Versus Data Blocks

The data blocks generally occupy a predetermined amount of frequency spectrum and a predetermined amount of time. However, due to the variations in the possible types of modulation, the number of bits transmitted within a block is variable. That is, typically the data blocks include a predetermined number of data symbols. The number of bits within a data symbol is based on the type of modulation used in transmission. That is, a 4 QAM symbol includes fewer bits than a 16 QAM symbol. The number of bits included within a sub-protocol data unit is generally set to a predetermined number. Additionally, depending upon the quality of the transmission link, the bits to be transmitted can be coded, adding additional bits. Therefore, the number of sub-protocol data units included within a data block is variable. The variability of the number of sub-protocol units included within a data block will be discussed further when discussing the transmission modes.

Figure 3:
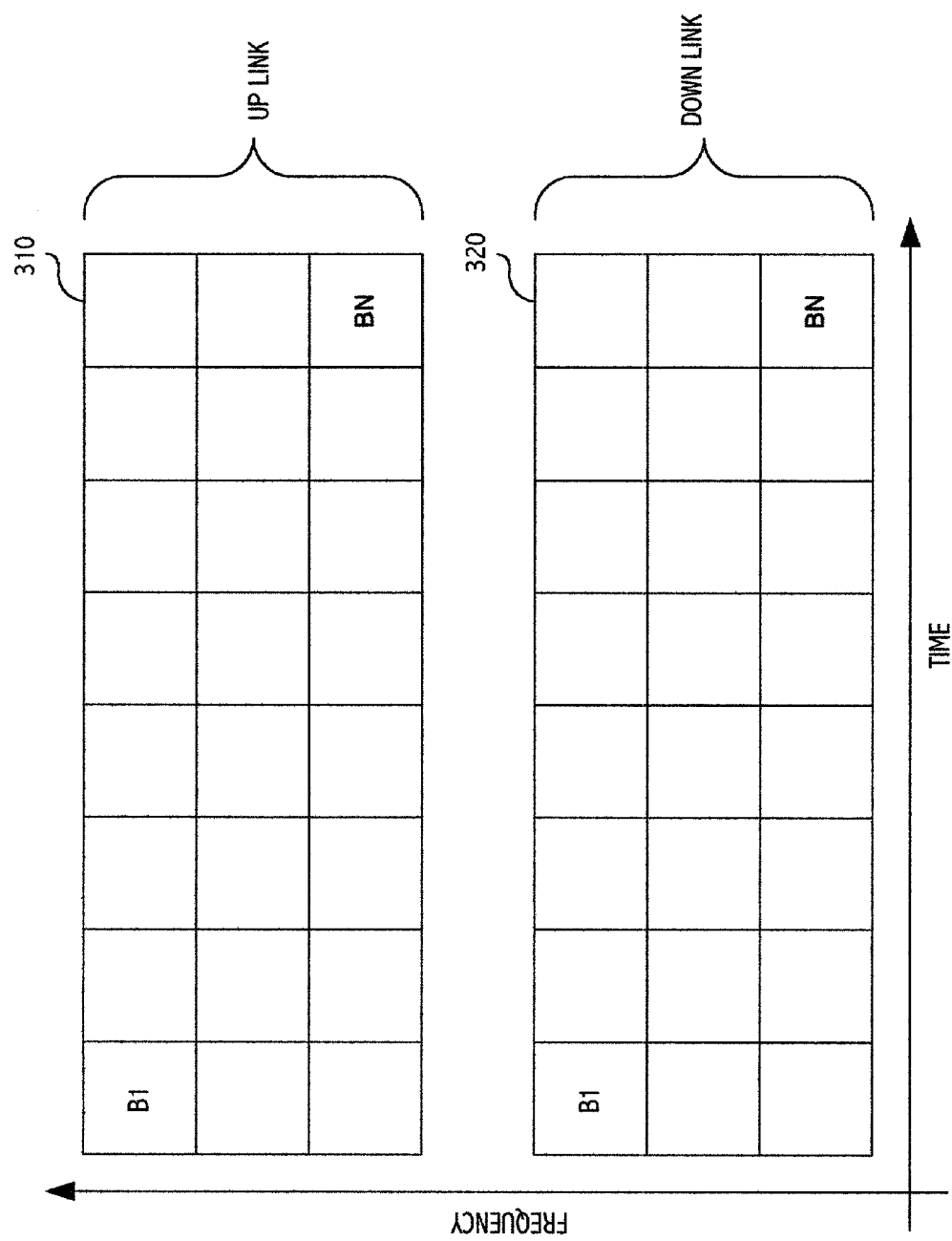
FIG. 3 shows an up link frame and a down link frame for a FDD wireless system.

FIG. 3 shows two frames 310, 320. A first frame 310 can be designated as the up link frame, and a second frame 320 can be designated as the down link frame. As shown in FIG. 3, the up link frame 310 occupies a different frequency band than the down link frame 320. As described before, the frames include a finite number of frequency blocks and time slots. The frames 310, 320 of FIG. 3 are consistent with FDD transmission.

Figure 4:
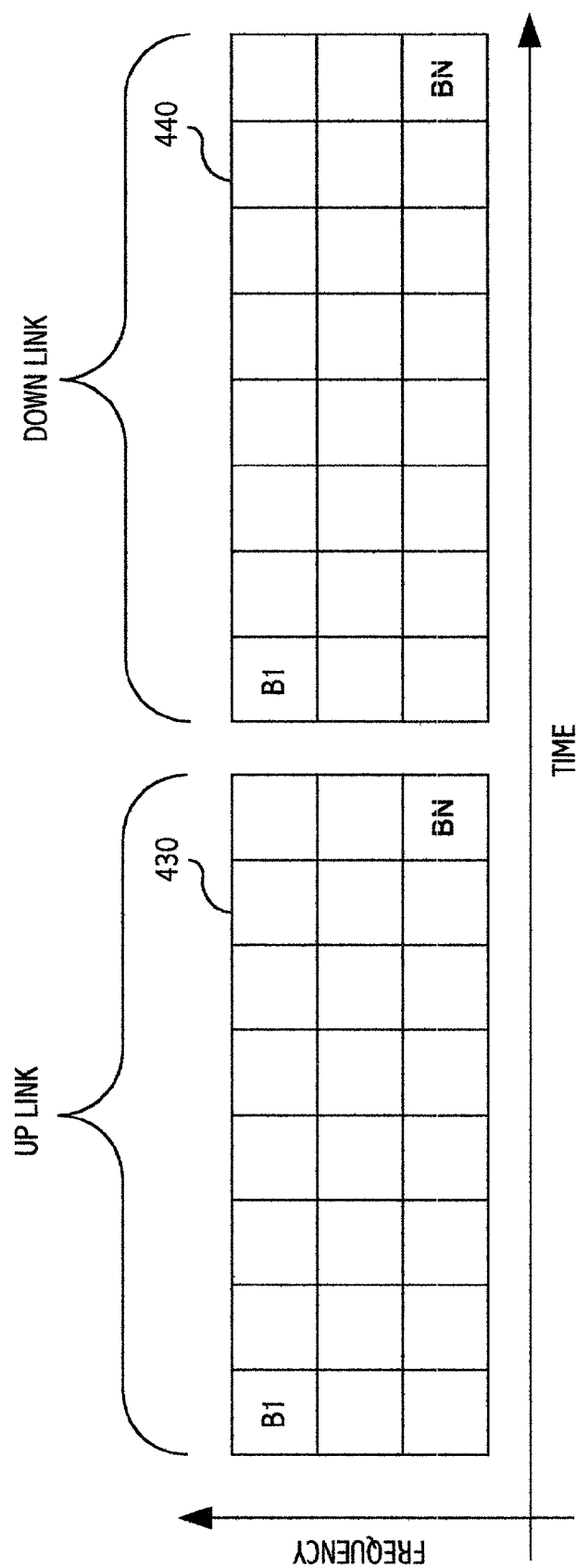
FIG. 4 shows an up link frame and a down link frame for a TDD wireless system.

FIG. 4 also shows two frames 430, 440. A first frame 430 can be designated as the up link frame, and a second frame 440 can be designated as the down link frame. As shown in FIG. 4, the up link frame 430 occupies a different time duration than the down link frame 440. As described before, the frames include a finite number of frequency blocks and time slots. The frames 430, 440 of FIG. 4 are consistent with TDD transmission.

The base transceiver station receives information regarding the quality of transmission links between the base station transceiver and the subscriber units. The quality of the links can be used to determine whether the transmission of data should include spatial multiplexing or communication diversity. Additionally, the base transceiver station receives data requests from the subscriber units. The data requests include information regarding the size and data type of data to be transmitted. The scheduler utilizes the link quality information, the data size, and the data type (including priority and requisite quality of service (QoS)) for generating the schedule.

The scheduling decisions that are based upon the transmission quality between a base transceiver station and subscriber unit can be made at either the base station transceiver or the subscriber unit. The scheduling decisions can be made for both down link transmission and up link transmission. It is essential that both the base transceiver station and the subscriber unit be aware of the scheduling, spatial multiplexing and diversity decisions that are made base upon the quality of the transmission link.

Contention Data Slots

In order for a subscriber to be included and scheduled within the maps as shown in FIGS. 3 and 4, the subscriber unit must indicate to the base transceiver station that the subscriber unit has data to be transmitted to the base transceiver station. This can be accomplished by the subscriber unit transmitting a Request to Send (RTS) signal to the base transceiver station when the subscriber unit has data to transmit to the base transceiver station. Generally, the up-link schedules or maps includes several blocks that are not scheduled to any subscriber unit, to allow RTS signals to be transmitted to and received by the base transceiver station. These RTS available blocks can be referred to as contention blocks. It is possible for more than one subscriber unit to transmit an RTS signal at the same time, causing RTS signals to never be received by the base transceiver station. Therefore, most wireless systems include contention management to account for simultaneous RTS transmissions. Contention management can include re-sending RTS signal according to some predetermined pattern.

Generally, the invention includes each subscriber unit monitoring the number of RTS signals the subscriber unit has sent to the base transceiver station before being serviced by the base transceiver station. As will be described later, the information depicting the number of RTS signals sent is used by the scheduler to aid in the determination of how many data blocks to schedule for transmission with each subscriber unit.

Minimizing the number of RTS signals sent by each subscriber unit for completing the transmission of data between each subscriber unit and the base transceiver station, optimizes the scheduling and transmission of the data. This invention minimizes the number of RTS signals required by including data transmission queue size value information of the subscriber units within transmitted data blocks. That is, the base transceiver station obtains data transmission queue size value information of the subscriber units from data blocks as well as from RTS signals sent by the subscriber units. As a result, when new data blocks are to be transmitted from a subscriber unit, the data transmission queue size value of the subscriber unit is incrementally increased. The incrementally increased data transmission queue size value is transmitted to the base transceiver station through the transmission of data blocks. Therefore, the number of RTS signals transmitted by the subscriber units is minimized, and scheduling management of data block transmission is improved. The method of including the data transmission queue size value within the transmitted data blocks will be discussed later.

Maintenance of Transmission Queues

The invention includes maintaining transmission data queues at both the subscriber unit and the base transceiver station. More precisely, a running queue of the number of data blocks to be transmitted from each subscriber unit to the base transceiver station is maintained at the base transceiver station, and each corresponding subscriber unit. Each subscriber unit continuously indicates to the base transceiver station the number of data blocks to be transmitted to the base transceiver station through sub-protocol data units transmitted within data blocks.

The maintenance of data transmission queue provides several benefits. For example, data block queue knowledge at both the subscriber unit and the base transceiver station aids management of the transmission of data block when data blocks are lost during transmission.

As previously described, the transmitted data blocks include data transmission queue size value information of the subscriber units. If a particular subscriber unit receives additional data blocks to be transmitted during the transmission of previous data blocks, the increase in the data transmission queue size value due to the additional data blocks can be conveyed to the base transceiver station without having to transmit additional RTS signals. This optimizes transmission management because the data block contention issues previously mentioned are less likely to occur.

Figure 5:
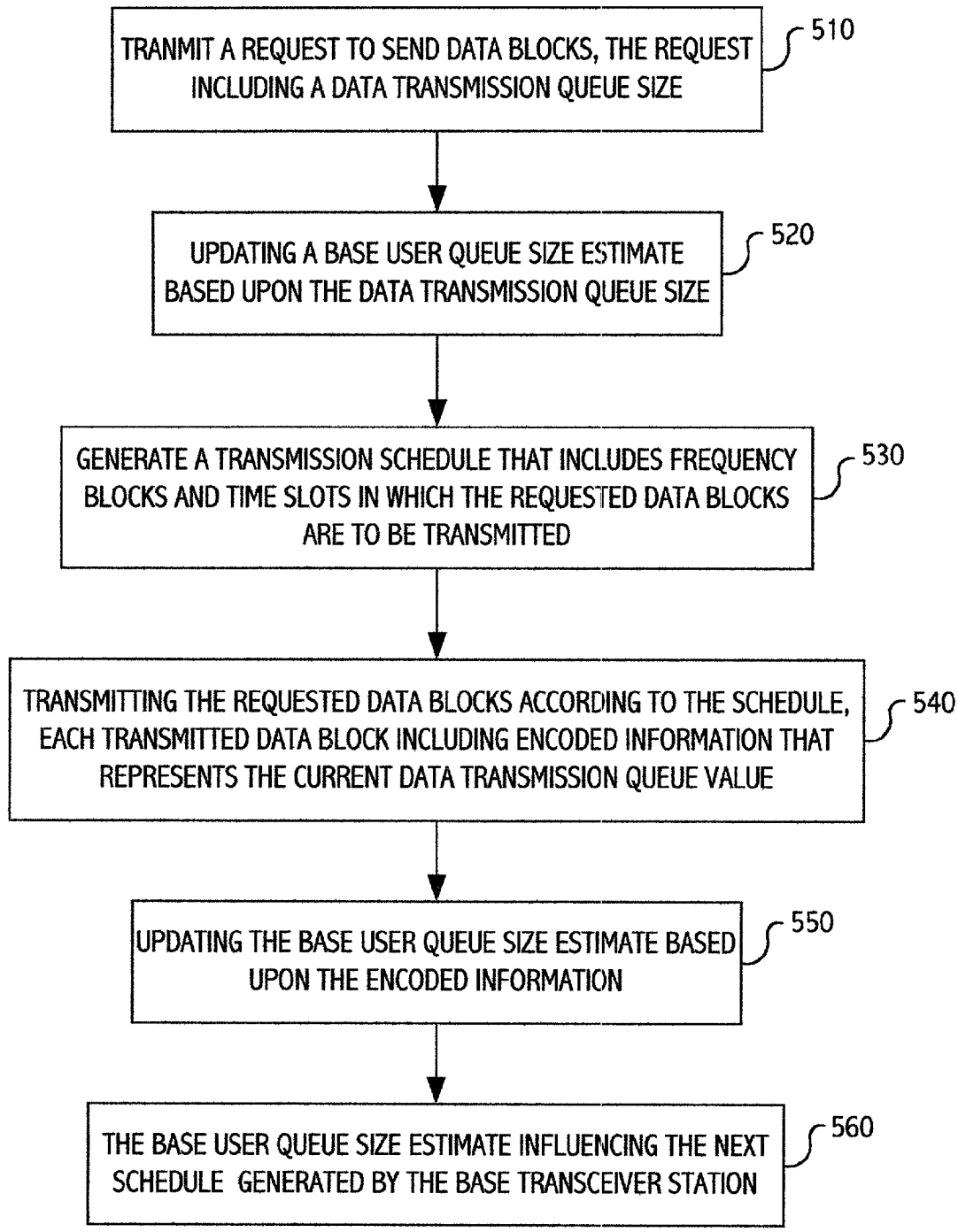
FIG. 5 shows a flow chart that includes steps of an embodiment of the invention.

FIG. 5 shows a flow chart that includes steps of an embodiment of the invention.

A first step 510 includes sending a Request to Send (RTS) for data block from a subscriber unit. The RTS includes a Data Transmission Queue Size that represents the number of data blocks that the subscriber unit requires to be sent to the base transceiver station. This step of the invention can be implemented in other ways. That is, all that is required is that the base transceiver station be aware that the subscriber unit intends to transmit data blocks to the base transceiver station, and that the base transceiver station be aware of the number of data blocks to be transmitted.

A second step 520 includes updating a Base (base transceiver station) User Queue Size Estimate based upon the received Data Transmission Queue Size. That is, the base transceiver station includes a User Queue Size Estimate that represents the number of data blocks the base transceiver station believes the subscriber unit has to transmit to the base transceiver station. Upon receiving an RTS from a subscriber unit, the base transceiver station sets the User Queue Size Estimate associated with the subscriber unit to the Data Transmission Queue Size of the subscriber unit.

A third step 530 includes generating a transmission schedule in which the Data Blocks that the subscriber unit requested are assigned to a specific frequency block and time slot within a scheduling map. If the base transceiver station is experiencing a large amount of up-link traffic, then all of the requested data blocks may not be scheduled. The implications of up-link traffic on the number of data blocks scheduled will be described in greater detail later. Methods for assigning frequency blocks and time slots to individual users is generally known in the field of wireless communications.

A fourth step 540 includes transmitting the data blocks the subscriber unit requested to send to the base transceiver station, according to the transmission schedule. Each data block transmitted from the subscriber unit to the base transceiver station includes encoded information (encoded within sub-protocol data units that are within the data blocks) reflecting the current data transmission queue value of the subscriber unit. As will be described later, the encoded information can include a range of values, rather than a specific value.

A fifth step 550 includes updating a base user queue size estimate based upon the encoded information. The base user queue size estimate is a queue maintained at base transceiver station that reflects an estimate of the data transmission queue value of the subscriber unit that sent the corresponding data block.

A sixth step 560 includes subsequently generated transmission schedules being influenced by the base user queue size estimate. That is, subsequently generated transmission schedules attempt to include the number of data blocks represented by the base user queue size estimate. Data blocks subsequently received by the base transceiver station can include new data transmission queue value representations of the subscriber unit, and therefore, influence subsequent transmission scheduling.

Encoding of the Data Transmission Queue Size

Figure 6:
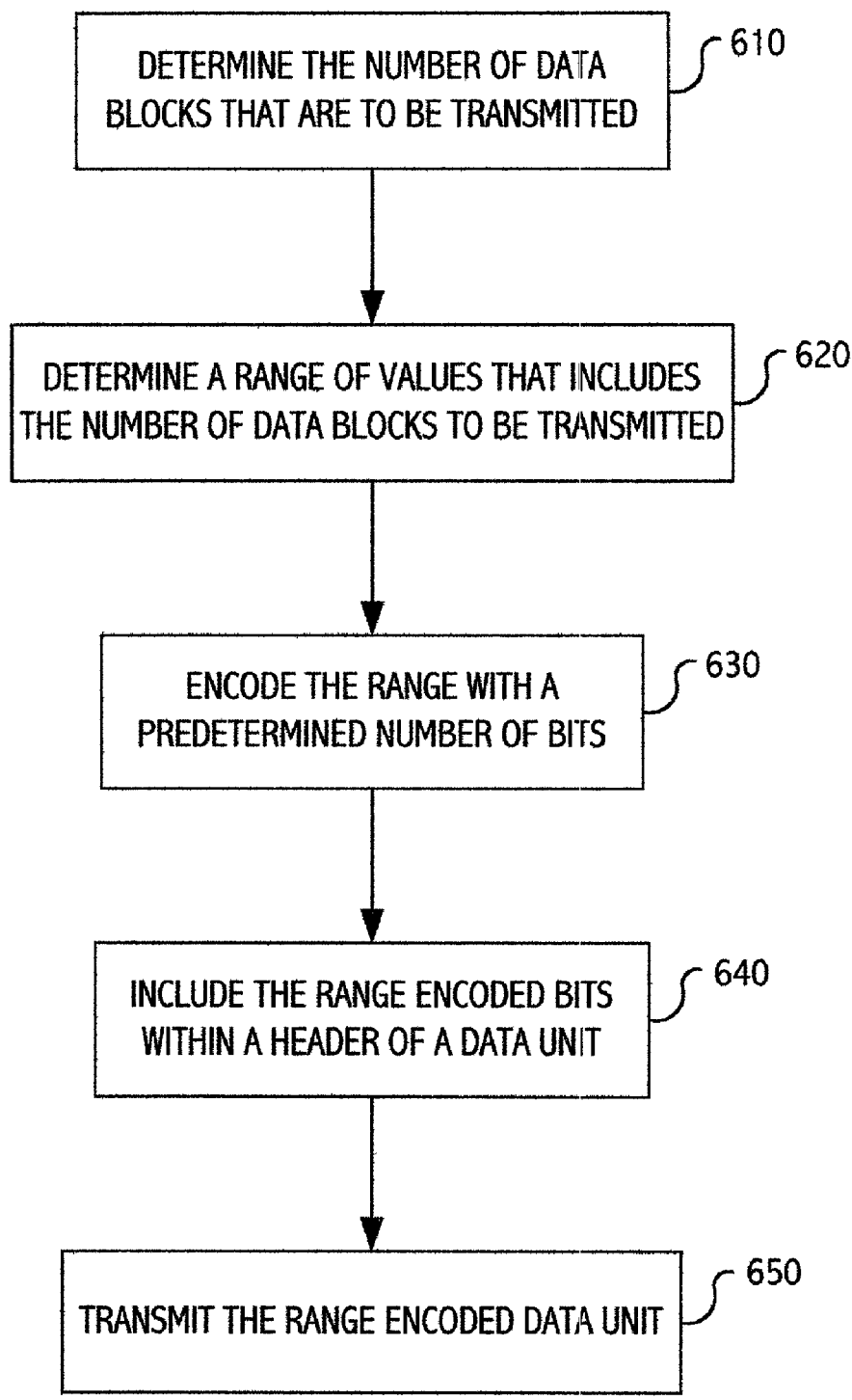
FIG. 6 is a flow chart that shows steps for encoding the data transmission queue size within a header of a sub-protocol data unit.

FIG. 6 is a flow chart that shows steps for encoding the data transmission queue size. Each sub-protocol unit generally includes a header, a payload and a CRC (cyclic redundancy check). The header includes general information about the sub-protocol data unit, the payload includes data being transferred, and the CRC is provided for detection of transmission errors. The data transmission queue size value of a subscriber unit is generally encoded within the header of each sub-protocol data unit transmitted to the base transceiver station. Encoding of the data transmission queue size value can reduce the total number of bits transmitted to the subscriber unit. Therefore, more bits of the sub-protocol data unit can be dedicated to payload. Encoding of the data transmission queue size value provides the base transceiver station with a real-time update of the number of data units within the subscriber unit to still be transmitted to the base transceiver station.

A first step 610 includes determining the number of data blocks (data transmission queue size value) that are to be transmitted to the base transceiver station. The number of data blocks can be determined based upon the number of data blocks within the buffers of data block queues of the subscriber units.

A second step 620 includes determining a range of values that correspond to the data transmission queue size value. This can be accomplished by referring to a predetermined look-up-table (LUT) as shown in FIG. 7. For a data transmission queue size value (number of data blocks to be transmitted), a corresponding range of values exits. For example, for a data transmission queue size value of 2, the corresponding range is 2–3. For a data transmission queue size value of 8, the corresponding range is 7–10. The LUT of FIG. 7 is provided as an example. Many different types of data transmission queue size value versus range values can be generated.

A third step 630 includes the selected range being encoded into a predetermined number of bits. The LUT of FIG. 7 also depicts the encoding of the ranges into three bits. The number of bits required to encode the range is variable.

A fourth step 640 includes locating the encoded in the headers of sub-protocol data unit located within the data blocks.

A fifth step 650 includes transmitting the range encoded data blocks.

Decoding the Ranges

Figure 8:
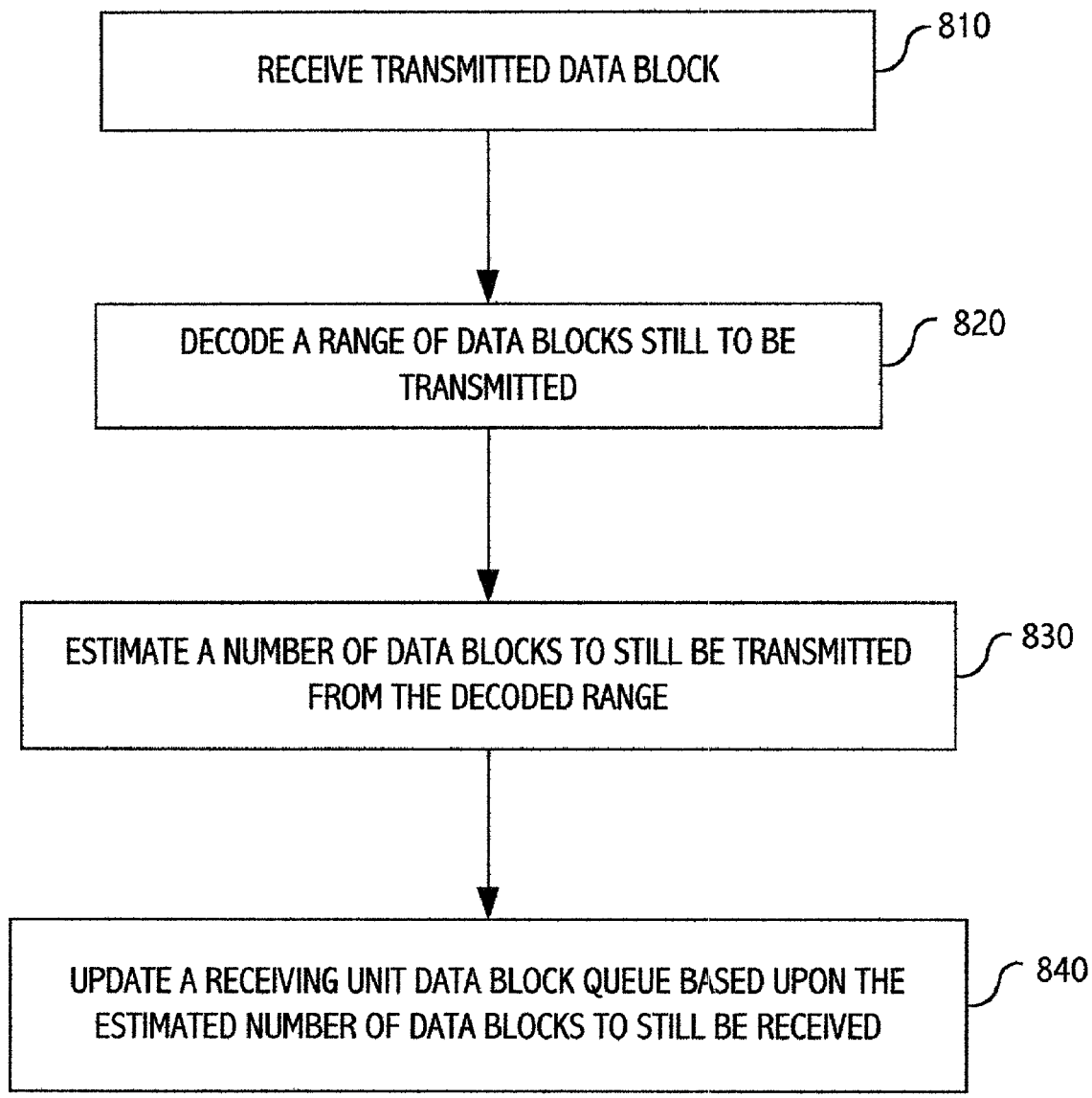
FIG. 8 is a flow chart that shows steps included in decoding a received sub-protocol data unit, to determine a number of data units to be transmitted from a subscriber unit.

FIG. 8 is a flow chart that shows steps included in decoding a received sub-protocol data unit for determining a number of data units to be transmitted from a subscriber unit.

A first step 810 includes the base transceiver station receiving the data blocks and corresponding sub-protocol data units.

A second step 820 includes decoding a range of data blocks that are still to be transmitted from the subscriber unit to the base transceiver station.

A third step 830 includes estimating from the decoded range, a number of data blocks that are still to be transmitted from the subscriber unit to the base transceiver station.

A fourth step 840 includes updating a receiving unit data block queue within the base transceiver station based upon the decoded number of data blocks to be received. That is, a data block queue within the base transceiver station that correspond to the subscriber unit that transmitted the data blocks is updated to reflect the subscriber data queue included within the header of the most recently transmitted sub-protocol data unit.

Figure 9:
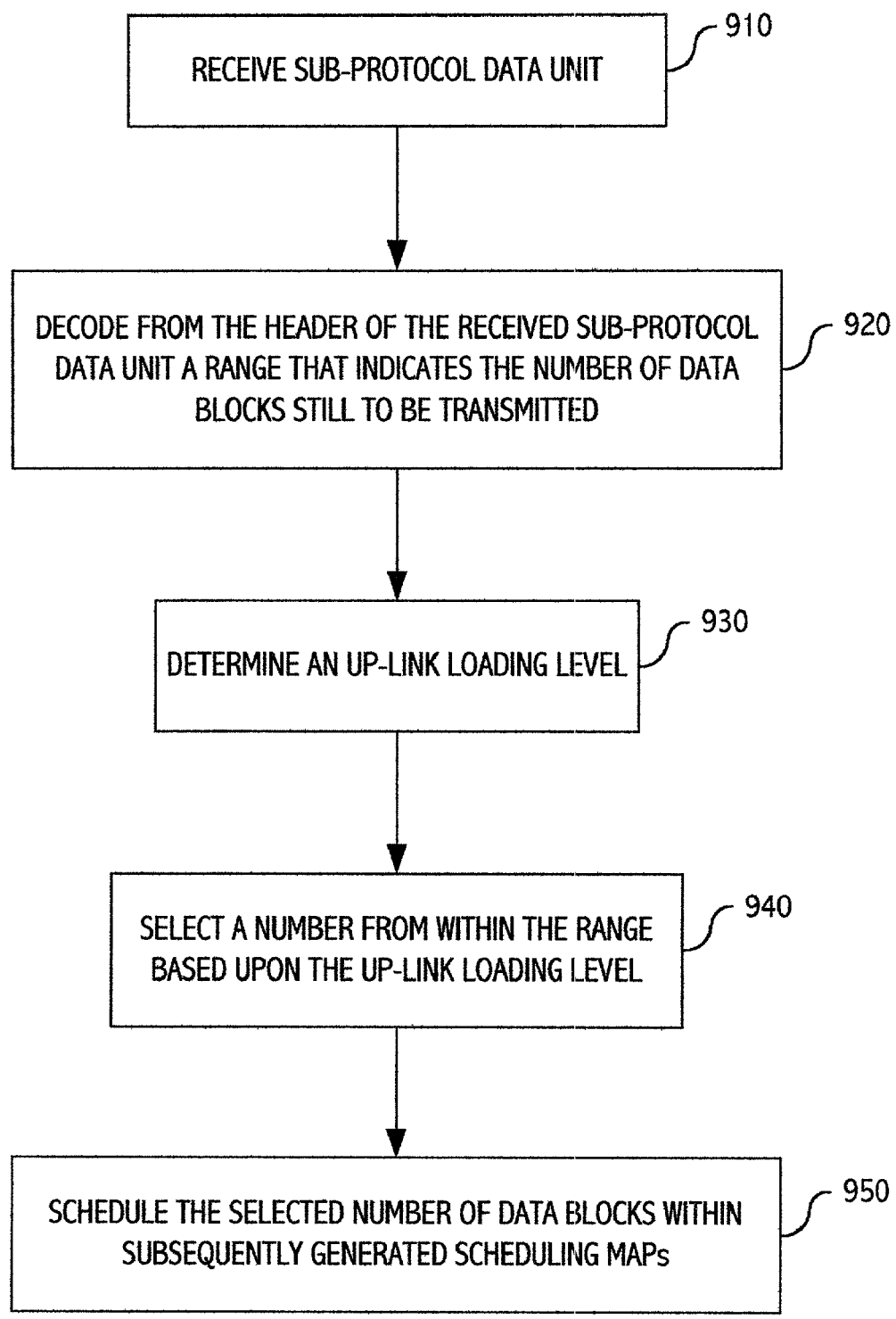
FIG. 9 is a flow chart that shows steps included in estimating a number of data units to be transmitted from the decoded range of data units.

FIG. 9 is a flow chart that shows steps included in estimating a number of data units to be transmitted from a decoded range of data units. That is, a subscriber unit transmits an encoded range of data blocks. From the decoded range, the base transceiver station must estimate how many data blocks to include within subsequent schedules.

A first step 910 includes receiving a data block transmitted by a subscriber unit according to a previously generated schedule.

A second step 920 includes decoding from the header of a sub-protocol data unit within the data block, a range that indicates the number of data blocks still to be transmitted from the subscriber unit. As previously mentioned, the range is encoded in a predetermined number of bits. A table like the table shown in FIG. 7 can be used to generate a range depending on the received finite number of encoded bits.

A third step 930 includes determining an up-link loading level. That is, typically, the base transceiver station is in communication with several subscriber units. The amount of up-link traffic between the base transceiver station and the subscriber unit can vary. However, the level of up-link traffic influences the scheduling of data blocks between the base transceiver station. The amount of up-link traffic provides an indication of the number of RTS signals being generated by the subscriber units, and also suggests that fewer contention slots are available during scheduling. As a result, each RTS signal is less likely to be received by the base transceiver station.

An embodiment of the invention includes each subscriber unit monitoring the number of times an RTS signal is transmitted by the subscriber unit before the RTS signal is successfully received. Each RTS signal transmitted includes this information. Therefore, when an RTS signal is successfully received, the base transceiver station also receives a number indicating the number of times the RTS signal was previously sent.

Another embodiment of the invention includes the subscriber units monitoring the amount of time required for each of the subscriber units to successfully transmit an RTS signal.

The base transceiver station maintains a weighted average of the number of RTS signals transmitted by all of the subscriber units in communication with the base transceiver station. That is, all of the subscriber units monitor the number of times RTS signal are transmitted before being successfully received. This number is transmitted with each RTS signal. The base transceiver station maintains a weighted average of number from all of the subscriber units transmitting to base transceiver station. The weighted average can be designated as the "RTS retries." For example, (RTS retries (weighted average))$_{N+1}$=K*(RTS retries)$_N$+ (1−K)*(number of RTS retries of the just received RTS signal). Where K is a weighting factor that varies from zero to one.

A weighted average is used rather than a strict average because particular subscriber units may have a problem with its RTS signal being received. A weighted average is less likely to be skewed by such a subscriber.

The weighted average can also include averaging over a fixed time window of the RTS retries. Therefore, only the most recent RTS retries influence the weighted average.

The RTS retries (weighted average) is then compared with a set of thresholds. If the RTS retries is greater than a first threshold, then a loading level designator is incremented. If the RTS retries is less than a second threshold, then the loading level is decremented. For example, the loading level can include a high (H), medium (M) and low (L) levels. A default initial level can be M. Depending upon the value of a present or most recent RTS retries value, the loading level can be incremented to H, or decremented to L. As the RTS retries value varies, the loading level is modified accordingly. The number of discrete load levels can include more than three levels.

A fourth step 940 includes selecting a number from the received range based upon the up-link load level. If the loading level is L, then a number at the low end of the range is selected. If the loading is H, then a number at the high end of the range is selected. If the loading level is M, then a number in the middle of the range is selected. For example, if the received range is 7–10, and the loading level is L, then the selected number is 7. If the loading level is M then the selected number is 8 or 9. If the loading level is H, then the selected number is 10. These are merely examples. The selection process can vary depending upon the system implemented.

A fifth step 950 includes scheduling the decoded and selected number of data blocks. That is, the selected number of data blocks estimates the number of data block to be transmitted from the subscriber unit to the base transceiver station. As described above, this number is an approximation that will vary depending upon the loading of the up-link. The scheduler will attempt to schedule the approximated number of data block slots to the up-link transmission of the subscriber unit.

Figure 10:
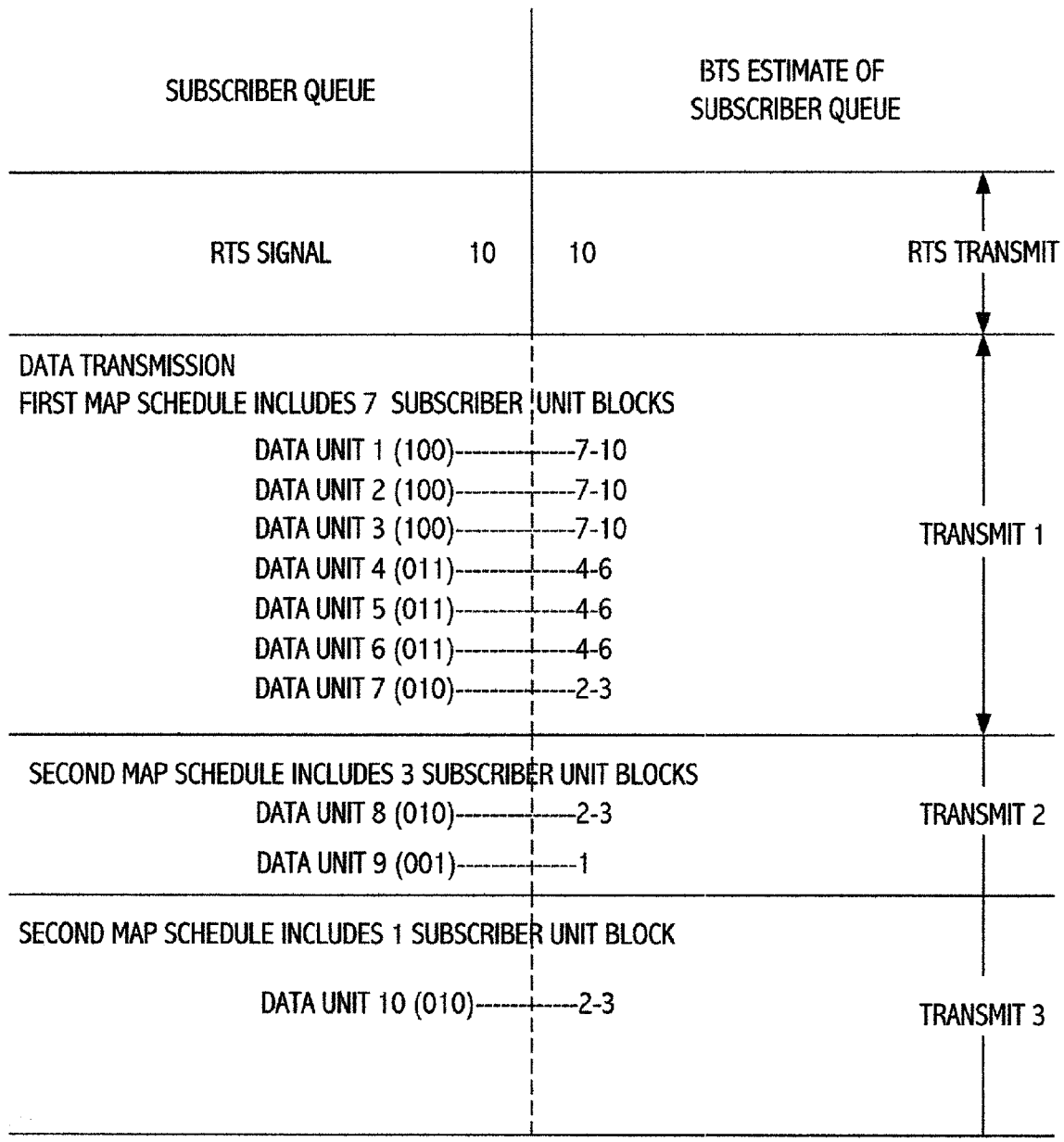
FIG. 10 shows a table depicting an example of the operation of an embodiment of the invention.

FIG. 10 shows a table depicting an example of the operation of an embodiment of the invention. The left side of the table indicates the data block queue (data transmission queue size value) of a subscriber unit, and the right side of the table indicates the data block queue (base user queue size estimate) of a corresponding base transceiver station. The progression from the top of the table to the bottom of the table follows the subscriber queue and the base transceiver station queue as data is transmitted from the subscriber unit to the base transceiver station. This example assumes that a data unit is the same size as a data block.

Initially, an RTS signal is transmitted from the subscriber unit to the base transceiver station. For this example, the RTS signal indicates a data block queue within the subscriber unit of 10. Upon receiving the RTS signal, the base transceiver station update a corresponding queue to 10.

The base transceiver station then allocates data blocks within a map. The map is transmitted to the subscriber unit (as well as to all other subscriber units in communication with the base transceiver station).

During the transmit1 time, the subscriber unit transmits sub-protocol data units according to the schedule. The first data unit indicates a range of 7–10 by encoding three bits within the header with 100. In this example, the subscriber transmits 7 data units within the time frame of the first map. The last data unit transmitted with the first transmit1 time, indicates a range of 2–3 data blocks.

After the transmit1 time, the scheduler generates a new schedule with a base transceiver data block queue of 2–3. The subscriber receives the new schedule. During the transmit2 time, the subscriber transmits 2 more data units. The last data unit transmitted during the transmit2 time, indicates that one more data block is still to be transmitted.

After the transmit2 time, the scheduler generates a schedule for the last data block. During the transmit3 time, the last data unit is transmitted indicating the data block queue of the subscriber unit is zero.

As describer earlier, the data block queue of the base transceiver station is determined from both the received range and the determined up-link loading level.

Orthogonal Frequency Division Multiplexing (OFDM) Modulation

The frequency spectrum of the transmitted signal can include multiple modulated carriers. The frequency blocks as depicted in the maps of FIGS. 2, 3 and 4 can include multiple carriers of a multiple carrier modulation system. A example of a multiple carrier modulated system if orthogonal frequency division multiplexing (OFDM).

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 11:
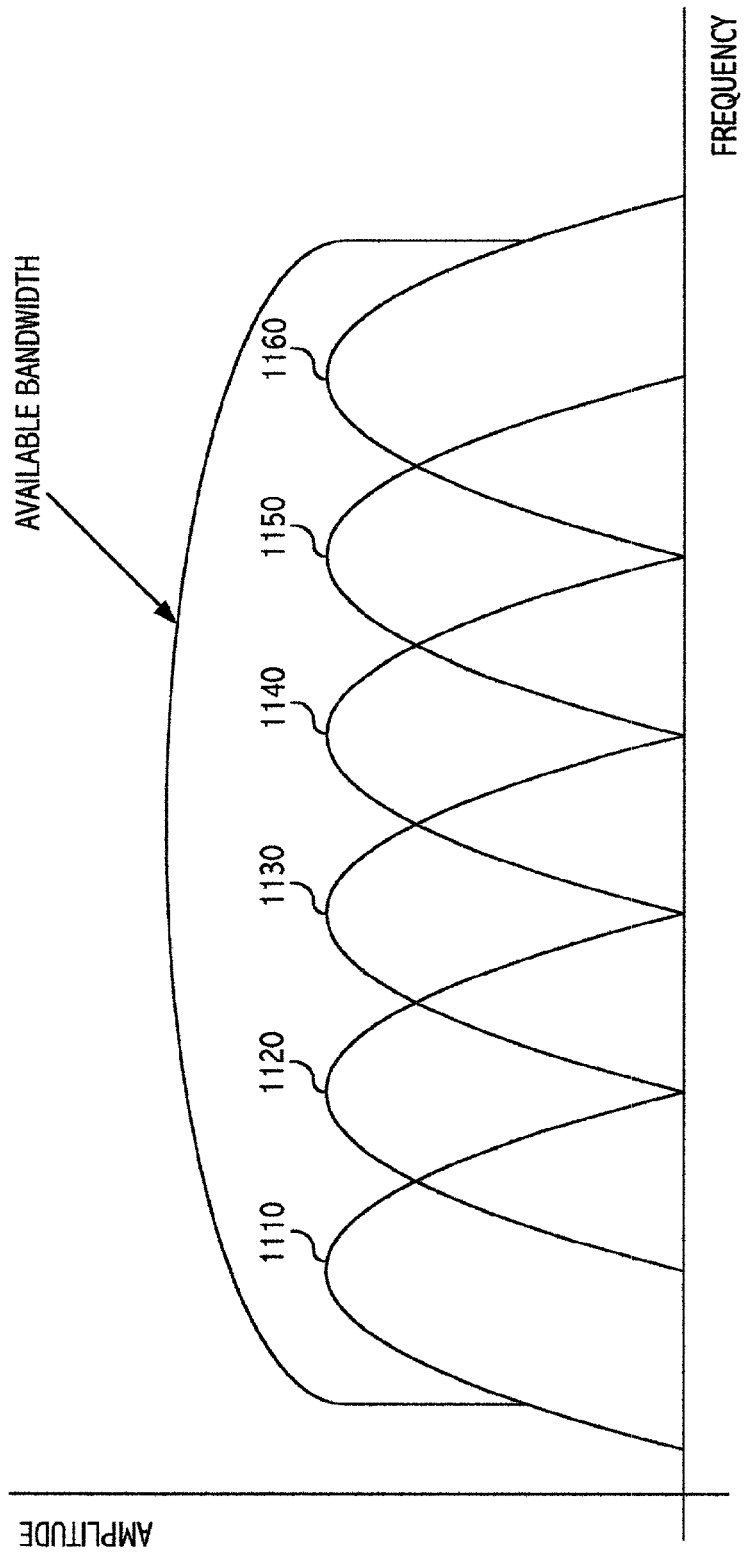
FIG. 11 shows the frequency spectrum of a set of OFDM carrier signals that can be used in an embodiment of the invention.

FIG. 11 shows a frequency spectrum of OFDM subcarrier signals 1110, 1120, 1130, 1140, 1150, 1160. Each sub-carrier 1110, 1120, 1130, 1140, 1150, 1160 is modulated by separate symbols or combinations of symbols.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the transmit OFDM waveform to look periodic. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Transmission Modes

The mode assignment provides information regarding the type of modulation and coding to be used when providing the data blocks of the service flow request. The mode assignment is generally determined by quality of the transmission link between the base station transceiver and the subscriber units. The quality of the transmission link can be determined in many different ways.

The transmission quality of the links between a subscriber unit and the base transceiver stations can be determined several different ways. A cyclic redundancy check (CRC) failure rate can be monitored. The higher the quality of the link, the lower the CRC failure rates. The monitoring of CRC failure rates of steams of symbols is well known in the field of communications.

A signal to interference of noise ratio (SINR) monitoring can also be used to determine the quality of the transmission links. Various techniques as are well known in the field of communications can be used to determine the SINR.

Based on the quality of the link between a base station transceiver and a subscriber unit, a transmission mode is assigned to the subscriber unit. As previously mentioned, the transmission mode determines the coding and modulation used in the transmission of data between the base station transceiver and a subscriber unit. The better the quality of the transmission link, the greater the amount of information that can be transmitted. For example, the better the quality of the link, the greater the allowable order of modulation. That is, 16 QAM generally requires a better transmission link than 4 QAM.

A poor quality link can require the transmitted data to be coded to minimize the error rate of the transmitted data. Generally, coding of the transmitted information reduces the rate the data is transmitted because the coding adds additional coding data. Examples of the types of coding used include convolutional coding and Reed Solomon coding. These common types of coding are well known in the field of communications.

The mode assignment can also determinations of other transmission characteristics. For example, the mode assignment can also be used for specifying transmission frequency bandwidth or transmission power.

Figure 12:
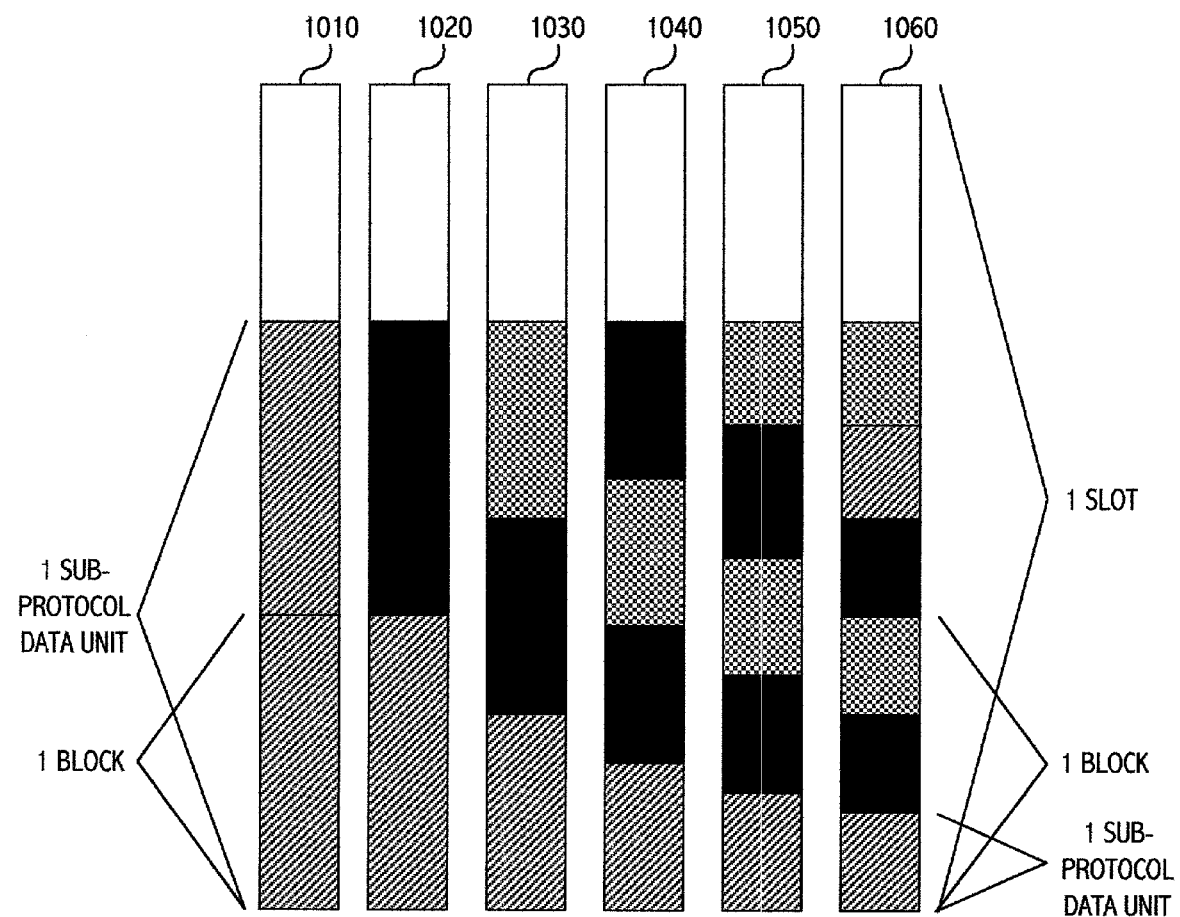
FIG. 12 show the relationship between data blocks, sup-protocol data units and the mode of operation of a wireless system of the invention.

FIG. 12 depicts several modes of block transmission according to the invention. The mode selection is generally based upon the quality of the transmission link between the base station transceiver and the subscriber units. The mode selection can determine the type of modulation (for example, 4 QAM, 16 QAM or 64 QAM), the type of coding (convolution or Reed Solomon), or whether the transmission includes spatial multiplexing or diversity.

As previously stated, several transmission link parameters can be used to establish the mode associated with the transmission of a sub-protocol data unit requested by a service flow. FIG. 12 depicts a relationship between a transmission data block (defined by a frequency block and time slot) and sub-protocol data unit according to an embodiment of the invention.

FIG. 12 shows a single time slot that is divided into three data block for six different modes. A first mode 1210 includes a sub-protocol data unit occupying two data blocks. A second mode 1220 includes a sub-protocol data unit occupying a single data block. A third mode 1230 includes three sub-protocol data units occupying two data blocks. A fourth mode 1240 includes two sub-protocol data units occupying one data block. A fifth mode 1250 includes five sub-protocol data units occupying two data blocks. A sixth mode 1260 includes three sub-protocol data units occupying a single data block.

As previously stated, the mode assignment determines the amount of information transmitted within each data block. Generally, the better the quality of the transmission link between a base transceiver station and a subscriber unit, the higher the mode assignment, and the greater the amount of information transmitted per data block.

It should be understood that the mode assignment of transmission links between base transceiver stations and subscriber units can vary from subscriber unit to subscriber unit. It should also be understood that the mode assignment of a transmission link between a base transceiver station and a subscriber unit can change from time frame to time frame.

It is to be understood that the number of frequency blocks allocated per time slot is variable. An embodiment of the scheduler includes the scheduler taking into consideration constraints on the frequency bandwidth on either the up link or the down link transmission. The frequency bandwidth allocations can be adjusted by varying the number of frequency blocks within a time slot. The frequency bandwidth allocated to a subscriber can be limited due to signal to noise issues, or the Federal Communication Committee (FCC) limitations. The scheduler can account for these limitations though allocations of frequency bandwidth through the scheduling.

The description of the invention has been limited to FDMA and TDMA. However, it is to be understood that the principles and concepts of the invention can be extended to include CDMA.

Although specific embodiments of the invention have been described and illustrated, the invention is not to be limited to the specific forms or arrangements of parts so described and illustrated. The invention is limited only by the appended claims.

What is claimed:

1. A method for wirelessly transmitting data between a plurality of subscriber units and a base transceiver station, the method comprising:
   at least one subscriber unit transmitting a request to send data blocks to the base transceiver station, the request including a data transmission queue size value;
   updating at the base transceiver station, a base user queue size estimate that corresponds to the one subscriber unit that transmitted the request to send data, the base user queue size estimate being based upon the data transmission queue size value;
   the base transceiver station generating a schedule that includes time slots and frequency blocks in which the requested data blocks are to be transmitted from the one subscriber unit to the base transceiver station;
   the at least one subscriber unit transmitting the data blocks the at least one subscriber unit requested to send according to the schedule, each transmitted data block comprising encoded information representing a current data transmission queue size value;
   updating the base user queue size estimate based upon the encoded information; and
   the base user queue size estimate influencing future schedules generated by the base transceiver station.

2. The method for wirelessly transmitting data between a plurality of subscriber units and a base transceiver station of claim 1, wherein:
   the request to send data is transmitted during a contention slot indicated within a schedule previously transmitted by the base transceiver station.

3. The method for wirelessly transmitting data between a plurality of subscriber units and a base transceiver station of claim 1, wherein:
   the data blocks comprise at least portion of a data unit, and each data unit comprises encoded information representing the current data transmission queue size value.

4. The method for wirelessly transmitting data between a plurality of subscriber units and a base transceiver station of claim 3, wherein the number of data units within each data block is dependent on a transmission mode.

5. The method for wirelessly transmitting data between a plurality of subscriber units and a base transceiver station of claim 3, wherein encoded information comprises:
   encoding the information within a plurality of bits within headers of the data units.

6. The method for wirelessly transmitting data between a plurality of subscriber units and a base transceiver station of claim 4, wherein encoding the information comprises:
   calculating a number of data blocks to be transmitted, the number of data blocks being dependent upon the transmission mode and the current data transmission queue value.

7. The method for wirelessly transmitting data between a plurality of subscriber units and a base transceiver station of claim 6, wherein the number of data blocks is encoded within a plurality of bits within headers of the data units.

8. The method for wirelessly transmitting data between a plurality of subscriber units and a base transceiver station of claim 7, wherein a range of data blocks is encoded with the plurality of bits of headers of the data units.

9. The method for wirelessly transmitting data between a plurality of subscriber units and a base transceiver station of claim 6, wherein the generated schedule includes a finite number of time slots that in combination form a frame, and the transmission mode can change from frame to frame.

10. The method for wirelessly transmitting data between a plurality of subscriber units and a base transceiver station of claim 1, wherein updating the base user queue size estimate comprises:
    decoding received data blocks to determine the current data transmission queue value.

11. The method for wirelessly transmitting data between a plurality of subscriber units and a base transceiver station of claim 1, wherein updating the base user queue size estimate comprises:
    decoding received data units to determine the current data transmission queue value, each data black comprising at least a portion of one of the data units.

12. The method for wirelessly transmitting data between a plurality of subscriber units and a base transceiver station of claim 11, wherein decoding received data units comprises:
    receiving a number that represents a number of data blocks to be transferred.

13. The method for wirelessly transmitting data between a plurality of subscriber units and a base transceiver station of claim 11, wherein decoding received data units comprises:
    receiving a range of data blocks;
    determining the current data transmission queue depending upon the received range and an up-link transmission mode.

14. The method for wirelessly transmitting data between a plurality of subscriber units and a base transceiver station of claim 13, wherein the range is decoded from a plurality of bits located within headers of the data units.

15. The method for wirelessly transmitting data between a plurality of subscriber units and a base transceiver station of claim 13, wherein determining the current data transmission queue comprises:
    estimating a level of up-link traffic;
    determining the current data transmission queue based upon the range and the level of the up-fink traffic.

16. The method for wirelessly transmitting data between a plurality of subscriber units and a base transceiver station of claim 1, wherein the scheduling includes generating a map, the map depicting dine slots and frequency blocks that are designated for the transmission of information between the base transceiver station and the one subscriber unit, the scheduling being influenced by the base user queue size value.

17. The method for wirelessly transmitting data between a plurality of subscriber units and a base transceiver station of claim 16, wherein the map includes down link transmission from the base transceiver station to the one subscriber unit, and up link transmission from the one subscriber unit to the base transceiver station.

18. The method for wirelessly transmitting data between a plurality of subscriber units and a base transceiver station of claim 16, wherein the map is transmitted to the plurality of subscriber units once per frame of time.

19. The method for wirelessly transmitting data between a plurality of subscriber units and a base transceiver station of claim 16, wherein the map includes time slots and frequency blocks for down link transmission from the base transceiver station to each of the plurality of subscriber units, and time slots and frequency blocks for up link transmission from each of the plurality of subscriber units to the base transceiver station.

20. A method for wirelessly transmitting data between a transmitter and a receiver, the method comprising:
    updating at the receiver, a receiver user queue size estimate that corresponds to the transmitter that transmitted a request to send data blocks, the receiver user queue size estimate being based upon a data transmission queue size value of the transmitter;
    the transmitter generating a schedule that includes time slots and frequency blocks in which the requested data blocks are to be transmitted from the transmitter to the receiver;
    the transmitter transmitting the data blocks the transmitter requested to send according to the schedule, each transmitted data block comprising encoded information representing a current data transmission queue size value;
    updating the receiver user queue size estimate based upon the encoded information; and
    the receiver user queue size estimate influencing future schedules generated by the transmitter.

21. The method for wirelessly transmitting data between a transmitter and a receiver, of claim 20, wherein:
    the data blocks comprise at least portion of a data unit, and each data unit comprises encoded information representing the current data transmission queue value.

22. The method for wirelessly transmitting data between a transmitter and a receiver, of claim 21, wherein the number of data units within each data block is dependent on a transmission mode.

23. The method for wirelessly transmitting data between a transmitter and a receiver, of claim 20, wherein encoded information comprises:
    encoding the information within a plurality of bits within headers of the data units.

24. The method for wirelessly transmitting data between a transmitter and a receiver, of claim 21, wherein encoding the information comprises:
    calculating a number of data blocks to be transmitted, the number of data blocks being dependent upon the transmission mode and the current data transmission queue value.

25. The method for wirelessly transmitting data between a transmitter and a receiver, of claim 23, wherein a range of data blocks is encoded with the plurality of bits of the headers of the data units.

26. The method for wirelessly transmitting data between a transmitter and a receiver, of claim 20, wherein updating the base user queue size estimate comprises:
    decoding received data units to determine the current data transmission queue value, each data block comprising at least a portion of one of the data units.

27. The method for wirelessly transmitting data between a transmitter and a receiver, of claim 26, wherein decoding received data units comprises:
    receiving a range of data blocks;
    determining the current data transmission queue depending upon the received range and an up-link transmission mode.

28. The method for wirelessly transmitting data between a plurality of subscriber units and a base transceiver station of claim 27, wherein determining the current data transmission queue comprises:

estimating a level of up-link traffic; determining the current data transmission queue based upon the range and the level of the up-link traffic.

29. A method for wirelessly receiving information from a transmit unit, the method comprising:

receiving a request to send data blocks from the transmit unit, the request including a data transmission queue size;

updating a user queue size based upon the data transmission queue size;

generating a schedule that includes time slots and frequency blocks in which the requested data blocks are to be transmitted;

receiving the requested data blocks according to the schedule, each transmitted data block comprising encoded information representing a current data transmission queue value;

updating the user queue size estimate based upon the encoded information; and the user queue size estimate influencing the generation of the next schedule.

30. The method for wirelessly receiving information from a transmit unit of claim 29, wherein updating the base user queue size estimate comprises:

decoding received data units to determine the current data transmission queue value, each data block comprising at least a portion of one of the data units.

31. The method for wirelessly receiving information from a transmit unit of claim 30, wherein decoding received data units comprises:

receiving a range of data blocks;

determining the current data transmission queue depending upon the received range and an up-link transmission mode.

32. The method for wirelessly receiving information from a transmit unit of claim 31, wherein determining the current data transmission queue comprises:

estimating a level of up-link traffic;

determining the current data transmission queue based upon the range and the level of the up-link traffic.

33. A method for wirelessly transmitting information from a transmit unit, the method comprising:

the transmit unit transmitting a request to send data blocks to a receiver unit, the request including a data transmission queue size value;

receiving a schedule in which the data blocks are to be transmitted;

the transmit unit transmitting the requested data blocks according to the schedule, each transmitted data block comprising encoded information representing a current data transmission queue value; wherein the current data transmission queue value influences the next schedule generated by the base transceiver station.

34. The method for wirelessly transmitting information from a transmit unit of claim 33, wherein the request to send data is transmitted during a contention slot indicated within a schedule previously transmitted by the base transceiver station.

35. The method for wirelessly transmitting information from a transmit unit of claim 33, wherein the data blocks comprise at least portion of a data unit, and each data unit comprises encoded information representing the current data transmission queue size value.

36. The method for wirelessly transmitting information from a transmit unit of claim 35, wherein the number of data units within each data block is dependent on a transmission mode.

37. The method for wirelessly transmitting information from a transmit unit of claim 36, wherein encoding the information comprises:

calculating a number of data blocks to be transmitted, the number of data blocks being dependent upon the transmission mode and the current data transmission queue value.

38. The method for wirelessly transmitting information from a transmit unit of claim 37, wherein the number of data blocks is encoded within a plurality of bits within headers of the data units.

39. The method for wirelessly transmitting information from a transmit unit of claim 38, wherein a range of data blocks is encoded with the plurality of bits of headers of the data units.

40. A system for wirelessly transmitting data between a plurality of subscriber units and a base transceiver station, the system comprising:

at least one subscriber unit transmitting a request to send data blocks to the base transceiver station, the request including a data transmission queue size value;

means for updating at the base transceiver station, a base user queue size estimate that corresponds to the one subscriber unit that transmitted the request to send data, the base user queue size estimate being based upon the data transmission queue size value;

means for generating a schedule that includes time slots and frequency blocks in which the requested data blocks are to be transmitted from the one subscriber unit to the base transceiver station;

the one subscriber unit transmitting the data blocks the one subscriber unit requested to send according to the schedule, each transmitted data block comprising encoded information representing a current data transmission queue size value;

means for updating the base user queue size estimate based upon the encoded information; wherein the base user queue size estimate influencing future schedules generated by the base transceiver station.

* * * * *

UNITED STATES PATENT AND TRADEMARK OFFICE
CERTIFICATE OF CORRECTION

| | | |
|---|---|---|
| PATENT NO. | : 7,065,051 B2 | |
| APPLICATION NO. | : 09/819947 | |
| DATED | : June 20, 2006 | |
| INVENTOR(S) | : Airy et al. | |

It is certified that error appears in the above-identified patent and that said Letters Patent is hereby corrected as shown below:

In column 15, at line 51, delete "dine" and insert --time--.

Signed and Sealed this

Fourth Day of September, 2007

JON W. DUDAS
*Director of the United States Patent and Trademark Office*